United States Patent
Jain et al.

(10) Patent No.: US 8,898,558 B2
(45) Date of Patent: Nov. 25, 2014

(54) MANAGING MULTIMODAL ANNOTATIONS OF AN IMAGE

(75) Inventors: Jhilmil Jain, Mountain View, CA (US); Jun Li, Mountain View, CA (US); Menaka Indrani, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1421 days.

(21) Appl. No.: 12/240,934

(22) Filed: Sep. 29, 2008

(65) Prior Publication Data

US 2010/0083153 A1 Apr. 1, 2010

Related U.S. Application Data

(60) Provisional application No. 61/012,386, filed on Dec. 7, 2007.

(51) Int. Cl.
- *G06F 17/24* (2006.01)
- *G06F 17/30* (2006.01)
- *G06F 3/048* (2013.01)

(52) U.S. Cl.
CPC .............. *G06F 17/241* (2013.01); *G06F 3/048* (2013.01); *G06F 17/3028* (2013.01)
USPC ........... 715/233; 715/230; 715/231; 715/232; 715/730; 715/731; 715/732; 715/733; 715/764; 709/227

(58) Field of Classification Search
CPC ............................... G06F 17/241; G06F 3/048
USPC ......... 715/730–733, 764, 230, 231, 232, 233; 709/227
See application file for complete search history.

(56) References Cited

U.S. PATENT DOCUMENTS

| | | | |
|---|---|---|---|
| 6,393,431 B1 * | 5/2002 | Salvati et al. | 1/1 |
| 7,068,309 B2 * | 6/2006 | Toyama et al. | 348/231.5 |
| 7,453,472 B2 * | 11/2008 | Goede et al. | 345/634 |
| 7,639,943 B1 * | 12/2009 | Kalajan | 396/429 |
| 7,814,040 B1 * | 10/2010 | Zhang et al. | 706/45 |
| 7,836,390 B2 * | 11/2010 | Lin et al. | 715/230 |
| 2001/0012401 A1 | 8/2001 | Nagy | |
| 2001/0041021 A1 * | 11/2001 | Boyle et al. | 382/305 |
| 2002/0163579 A1 | 11/2002 | Patel et al. | |
| 2003/0069716 A1 * | 4/2003 | Martinez | 702/188 |
| 2004/0123231 A1 | 6/2004 | Adams, Jr. et al. | |
| 2004/0205482 A1 | 10/2004 | Basu et al. | |
| 2005/0010562 A1 * | 1/2005 | Nagasaka | 707/3 |
| 2005/0044106 A1 * | 2/2005 | Duncan et al. | 707/104.1 |
| 2005/0183005 A1 | 8/2005 | Denoue et al. | |
| 2005/0289452 A1 | 12/2005 | Kashi et al. | |
| 2006/0010368 A1 | 1/2006 | Kashi | |
| 2006/0031755 A1 | 2/2006 | Kashi | |

(Continued)

*Primary Examiner* — Patrick Riegler

(57) ABSTRACT

Methods and computer readable mediums storing computer executable programs for managing multimodal annotations of an image are disclosed. A first communication channel is established between a first machine and a mobile device. A first hierarchical data structure generated by the mobile device is received at the first machine. The first hierarchical data structure includes an image annotated with at least one multimodal annotation. A representation of the first hierarchical data structure is rendered at the first machine. At least one multimodal annotation modification associated with the image is received at the first machine. The at least one multimodal annotation modification is incorporated into the first hierarchical data structure thereby generating a second hierarchical data structure.

22 Claims, 9 Drawing Sheets

(56) References Cited

U.S. PATENT DOCUMENTS

| | | |
|---|---|---|
| 2006/0143559 A1* | 6/2006 | Spielberg et al. ............. 715/512 |
| 2006/0264209 A1* | 11/2006 | Atkinson et al. ........... 455/422.1 |
| 2007/0022372 A1 | 1/2007 | Liu et al. |
| 2007/0118795 A1* | 5/2007 | Noyes et al. .................. 715/512 |
| 2007/0124673 A1 | 5/2007 | Trotto et al. |
| 2007/0174761 A1* | 7/2007 | Lin et al. ....................... 715/512 |
| 2007/0293265 A1* | 12/2007 | Fei et al. .................... 455/556.1 |
| 2008/0250080 A1* | 10/2008 | Arrasvuori et al. ........... 707/203 |

* cited by examiner

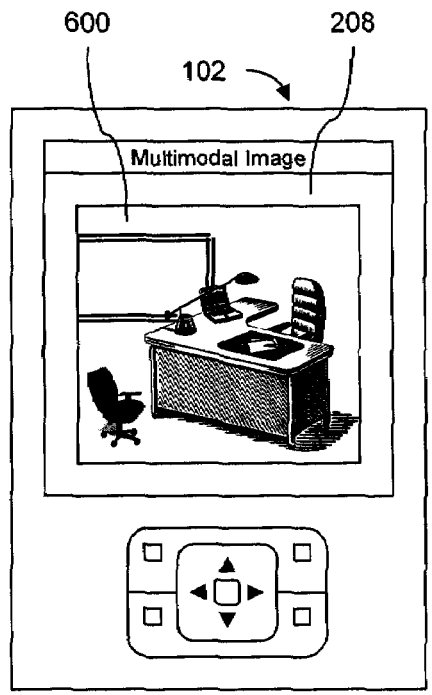 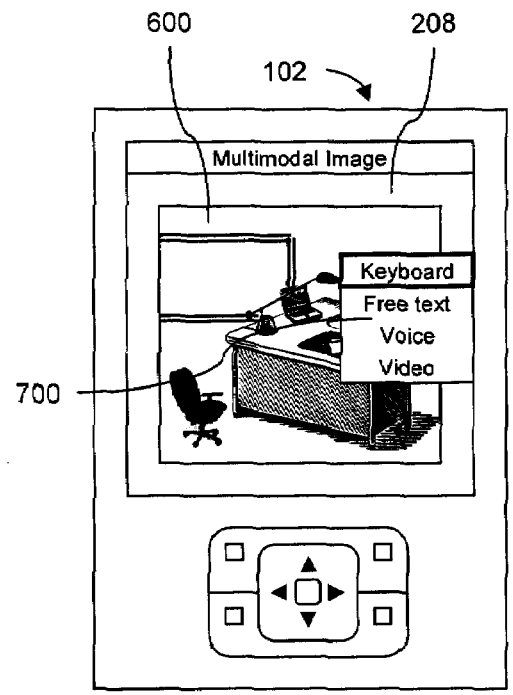
FIG. 6    FIG. 7
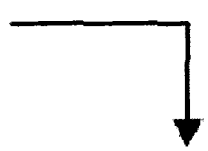 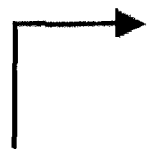
FIG. 8(a)    FIG. 8(b)
 
FIG. 8(c)    FIG. 8(d)

MANAGING MULTIMODAL ANNOTATIONS OF AN IMAGE

CROSS REFERENCE TO RELATED APPLICATIONS

This Application claims the benefit of U.S. Provisional Application Ser. No. 61/012,386, filed Dec. 7, 2007, titled "Managing Multimodal Annotations Of An Image" which is hereby incorporated by reference herein as if reproduced in full below.

FIELD OF THE INVENTION

The present invention generally relates to data management and more particularly to managing multimodal annotations of an image.

BACKGROUND OF THE INVENTION

Mobile devices, such as for example cell phone and personal digital assistants (PDA), are increasingly being equipped with peripheral devices that enable the mobile devices to capture and process multimodal information. Examples of such multimodal information include, but are not limited to, audio, image, video, structured text, free hand text, bar codes, and free hand sketches.

Such mobile devices are often used as personal information assistants or personal shopping assistants and used to gather and store different types of data often collected from multiple different locations. In some cases, a user may use a mobile device to collect and store individual multimodal data associated with a project, such as for example, a room decorating project. Examples of such multimodal data may include pictures of the room, the dimensions of the room, desired furniture items, the desired placement of such furniture items, and desired decorative accessories.

The user may retrieve the multimodal data stored in the mobile device when the user visits, for example, a retail store to purchase project related items. The user may retrieve the stored multimodal data for review by in-store personnel and seek the advice of such personnel regarding the purchase of items relating to the project, or decorating tips. An effective annotation system may enable a user to collect and organize the different multimodal items associated with a project.

SUMMARY OF THE INVENTION

One aspect of the invention is directed to managing multimodal annotations of an image. A first communication channel is established between a first machine and a mobile device. A first hierarchical data structure generated by the mobile device is received at the first machine. The first hierarchical data structure includes an image annotated with at least one multimodal annotation. A representation of the first hierarchical data structure is rendered at the first machine. At least one multimodal annotation modification associated with the image is received at the first machine. The at least one multimodal annotation modification is incorporated into the first hierarchical data structure thereby generating a second hierarchical data structure.

BRIEF DESCRIPTION OF THE DRAWINGS

FIG. 6 is an illustration of one example of a base image displayed on the display screen of one embodiment of a mobile device;

FIG. 7 is an illustration of one example of a multimodal object type selection menu displayed on the display screen of one embodiment of a mobile device;

FIGS. 8 (*a*)-(*d*) are illustrations of examples of a plurality of different multimodal object type gestures that are recognized by one embodiment of an image annotation module;

DETAILED DESCRIPTION OF THE DRAWINGS

Figure 1:
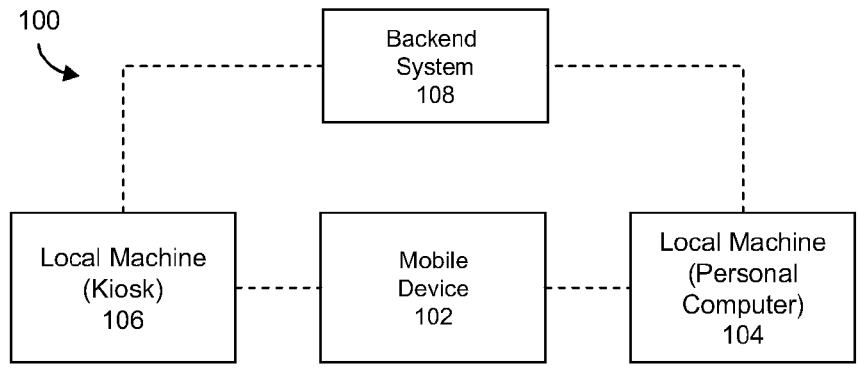
FIG. 1 is a block diagram representation of an example of a system that may be used to implement one embodiment of managing multimodal annotations of images in an image based project.

Referring to FIG. 1, a block diagram representation of an example of a system 100 that may be used to implement one embodiment of managing multimodal annotations of images in an image based project is shown. An image based project includes one or more base images annotated with one or more multimodal annotations. Examples of the different types of multimodal annotations include, but are not limited to, images, video, audio recordings, barcodes, structured text, free hand text, and free hand sketches. The system 100 is a distributed system that generally includes a mobile device 102, one or more local machines 104, 106 and a backend system 108.

The mobile device 102 is generally used to gather and organize data associated with an image based project. More specifically, the mobile device 102 is used to capture one or more base images and to annotate the one or more of the base images using one or more multimodal objects collected using the mobile device 102. Examples of mobile devices 102 include, but are not limited to, personal digital assistants (PDA), and smart phones. The mobile device 102 provides the user with the ability to collect the base images and/or multimodal objects from a number of different locations.

In one embodiment, the local machine 104, 106 facilitates the exchange of image based project data between the mobile device 102 and the backend system 108. Examples of local machines 104, 106 include, but are not limited to, a personal computer 104 and an in-store kiosk 106. In one embodiment, the local machine 104, 106 operates as a conduit for transferring the image based project from the mobile device 102 to the backend system 108. A communication channel is established between the mobile device 102 and the backend system 108 via the local machine 104, 106. The mobile device 102 transmits the image based project from the mobile device 102 to the backend system 108 via the local machine 104, 106. The backend system 108 stores and hosts the received image based project. In one embodiment, the user is provided with the option of viewing the image based project stored at the backend system 108 at the local machine 104, 106. The local machine 104, 106 interfaces with the backend system 108 to render the image based project at the local machine 104, 106.

In one embodiment, the user is provided with the option of modifying the image based project stored at the backend system 108 via the local machine 104, 106. The local machine 104, 106 receives user provided multimodal annotation modifications to the image based project via local machine peripheral devices. In one embodiment, the multimodal annotation modification includes one or more of an addition of a multimodal annotation object to the image based project, a deletion of a multimodal annotation object from the image based project and a revision of an existing multimodal annotation of the image based project.

The backend system 108 receives the multimodal annotation modifications received at the local machine 104, 106 via a communication channel established between the local machine 104, 106 and the backend system 108. The backend system 108 incorporates the multimodal annotation modifications into the image based project at the backend system 108 and renders the updated image based project at the local system 104, 106. In one embodiment, the image based project is not stored at the local machine 104, 106. In one embodiment, the multimodal annotation modifications received at the local machine 104, 106 are not stored or incorporated into the image based project at the local system 104, 106. In one embodiment, the user is provided with the option of downloading a copy of the image based project for storage at the local machine 104, 106.

Storing and hosting the image based project at the backend system 108 enables any local machine 104, 106 to establish a communication channel between that local machine 104, 106 and the backend system 108 responsive to user commands received via that local machine 104, 106. The local machine 104, 106 operates as a user interface to the backend system 108. The backend system 108 renders the image based project at the local system 104, 106, and incorporates any multimodal annotation modifications received at the local machine 104, 106 into the image based project responsive to user commands received at the local system 104, 106.

Figure 2:
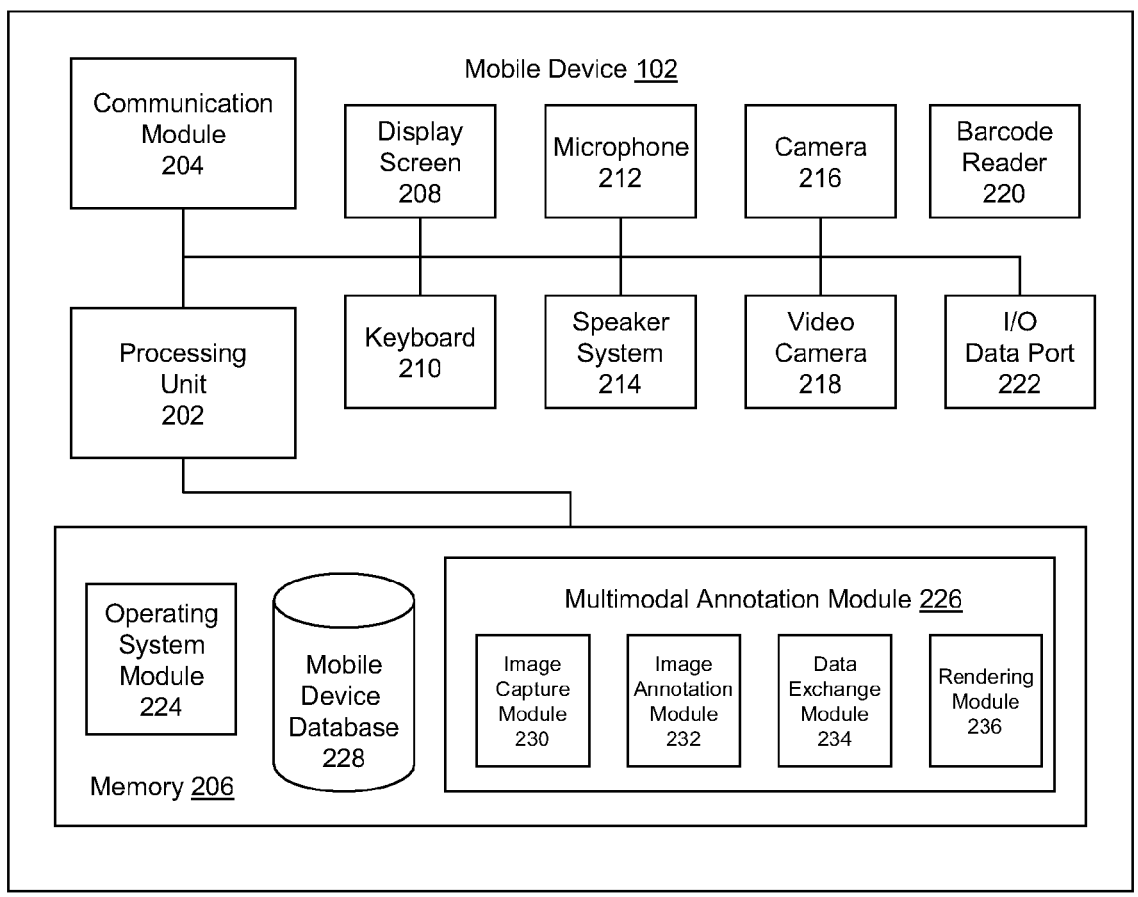
FIG. 2 is a block diagram representation of one embodiment of a mobile device.

Referring to FIG. 2 a block diagram representation of one embodiment of a mobile device 102 is shown. The mobile device 102 generally includes a processing unit 202, a communication module 204, a memory 206, and a display screen 208. In one embodiment, the display screen 208 is a touch screen display screen. In one embodiment, the mobile device 102 includes a stylus where the stylus is used to make mobile device entries via the touch screen display screen.

The mobile device 102 also includes one or more of a keyboard 210, a microphone 212, a speaker system 214, a camera 216, a video camera 218, a barcode reader 220, and an input/output data port 222. While the mobile device 102 has been described as including a number of different peripheral devices that facilitate the collection and the rendering of different types of multimodal objects, alternative embodiments may include other types of peripheral devices that facilitate the collection of multimodal objects and/or the rendering of the image based project on the mobile device 102. In one embodiment, the input/output port is available for connection to external peripheral devices that may facilitate the collection of multimodal objects and/or rendering of the image based project on the mobile device 102.

The processing unit 202 generally includes a processor or controller. In one embodiment, the communication module 204 generally coordinates the exchange of data between the mobile device 102 and other devices. In one embodiment, the communication module 204 coordinates the exchange of data between the mobile device 102 and local machines 104, 106. In one embodiment, the communication module 204 coordinates the exchange of data between the mobile device 102 and a personal computer 104. In one embodiment, the communication module 204 coordinates the exchange of data between the mobile device 102 and an in-store kiosk 106. In one embodiment, the communication module 404 supports communication via a networking infrastructure. In one embodiment, the communication module 204 supports communication via the Internet. In one embodiment, the communication module 204 supports wireless communication. In one embodiment, the communication module 204 supports short range wireless communication. In one embodiment, the communication module 204 supports Bluetooth communication. In one embodiment, the communication module 204 supports wired communication.

In one embodiment, an operating system module 224 and a multimodal annotation module 226 are stored in the memory 206. In one embodiment, the memory 206 also includes a mobile device database 228. Alternative embodiments may include additional modules that facilitate the performance of image based project management and/or multimodal annotation functions. In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

The multimodal annotation module 226 generally manages the image based project at the mobile device 102. In one embodiment, the multimodal annotation module 226 generally includes an image capture module 230, an image annotation module 232, a data exchange module 234, and a rendering module 236. Alternative embodiments may include additional modules that facilitate the performance of multimodal annotation management functions. The image capture module 230 generally coordinates the capture of the base images for use in the image based project. The image annotation module 232 generally coordinates the annotation of the base images using one or more multimodal objects captured at the mobile device 102. The data exchange module 234 generally coordinates the transmission of the image based project from the mobile device 102 to other devices. The rendering module 236 generally renders the image based project at the mobile device 102.

Figure 3:
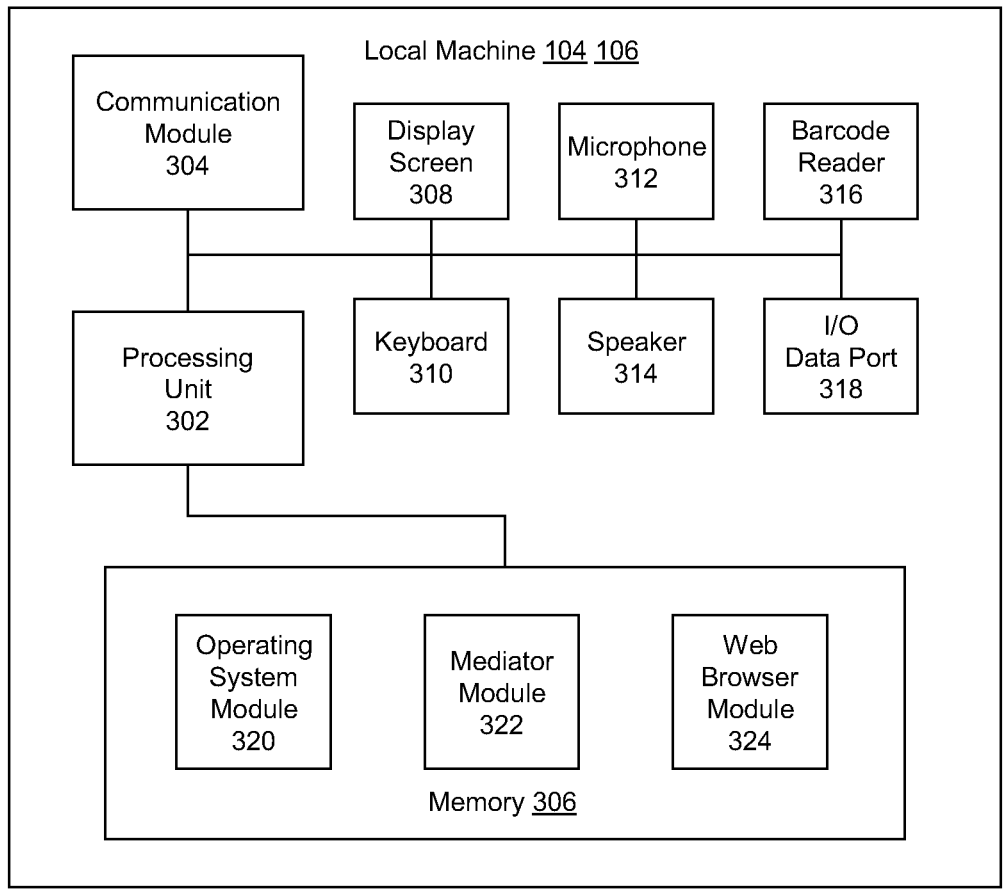
FIG. 3 is a block diagram representation of one embodiment of a local machine.

Referring to FIG. 3, a block diagram representation of one embodiment of a local machine 104, 106 is shown. The local machine 104, 106 generally includes a processing unit 302, a communication module 304, a memory 306 and a display screen 308. The local machine 104, 106 also includes a number of peripheral devices including one or more of a keyboard 310, a microphone 312, a speaker system 314, a barcode reader 316, and input/output data port 318.

The processing unit 302 generally includes a processor or controller. In one embodiment, the communication module 304 generally facilitates the exchange of data between the local machine 104, 106 and other devices. In one embodiment, the communication module 304 facilitates the exchange of data between the local machines 104, 106 and the mobile device 102. In one embodiment, the communication module 304 facilitates the exchange of data between the local machine 104, 106 and the backend system 108. In one embodiment, the communication module 304 supports communication via a networking infrastructure. In one embodiment, the communication module 304 supports communication via the Internet. In one embodiment, the communication module 304 supports wireless communication. In one embodiment, the communication module 304 supports short range wireless communication. In one embodiment, the communication module 304 supports Bluetooth communication. In one embodiment, the communication module 304 supports wired communication.

In one embodiment, an operating system module 320, a mediator module 322, and a web browser module 324 are stored in the memory 306. In one embodiment, the web browser module 324 enables the local machine 104, 106 to communicate with online web applications. In one embodiment, the mediator module 322 is controlled by the web browser module 324 and operates as a bridge between the mobile device 102 and the backend system 108 for exchanging image based project data between the mobile device 102 and the backend system 108. In other words, the mediator module 322 is an application installed locally at the local machine 104, 106 and is controlled by the web browser module 324. Alternative embodiments may include additional modules that facilitate the operation of the local machine 104, 106.

In one embodiment, the memory 306 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 302 generally retrieves and executes machine readable instructions or software programs that are stored in the memory 306.

Figure 4:
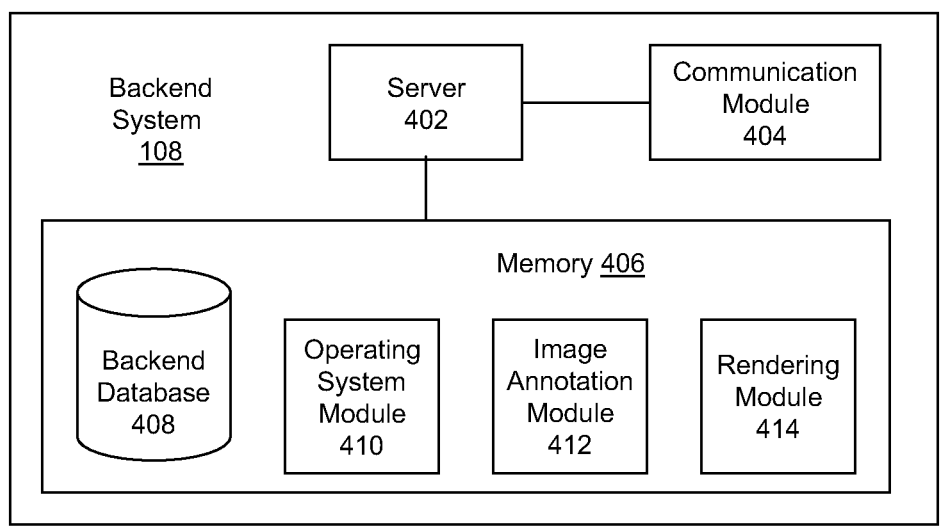
FIG. 4 is a block diagram representation of one embodiment of a backend system.

Referring to FIG. 4, a block diagram representation of one embodiment of a backend system 108 is shown. The backend system 108 generally includes a server 402, a communication module 404, and a memory 406. The server 402 includes a processor or controller. The communication module 404 facilitates communications between the backend system 108 and other devices. In one embodiment, the communication module 404 supports communication via a networking infrastructure. In one embodiment, the communication module 404 supports communication via the Internet. In one embodiment, the communication module 404 supports wireless communication. In one embodiment, the communication module 404 supports short range wireless communication. In one embodiment, the communication module 404 supports Bluetooth communication. In one embodiment, the communication module 404 supports wired communication.

In one embodiment, a backend database 408, an operating system module 410, an image annotation module 412, and a rendering module 414 are stored in the memory 406. The backend database 408 is used to stored image based projects received at the backend system 108. The image annotation module 412 generally coordinates the annotation of the base images responsive to the receipt of one or more multimodal annotation modifications from a local machine 104, 106. The rendering module 414 generally renders the image based project at the local machine 104, 106. In one embodiment, the rendering module 414 generally renders image based projects at the local machine 104, 106 via the web browser module 324 running on the local machine 104, 106. Alternative embodiments may include additional modules that facilitate the operation of the backend server 108.

In one embodiment, the memory 406 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The server 402 generally retrieves and executes machine readable instructions or software programs that are stored in the memory 406.

As mentioned previously, the mobile device 102 is generally used to gather and organize data associated with an image based project. More specifically, the multimodal annotation module 226 generally facilitates the capture of multimodal objects and the annotation of base images with the captured multimodal objects at the mobile device 102. In one embodiment, the multimodal annotation module 226 structurally organizes the captured multimodal objects into a hierarchical data structure. In one embodiment, the multimodal annotation module 226 supports the bidirectional exchange of image based project data between the mobile device 102 platform and backend system 108 platform via a local machine 104, 106. In one embodiment, the multimodal annotation module 226 supports the use of gesture-based user interface mechanisms. The multimodal annotation module 226 includes the image capture module 230, the image annotation module 232, the data exchange module 234, and the rendering module 236.

Figure 5:
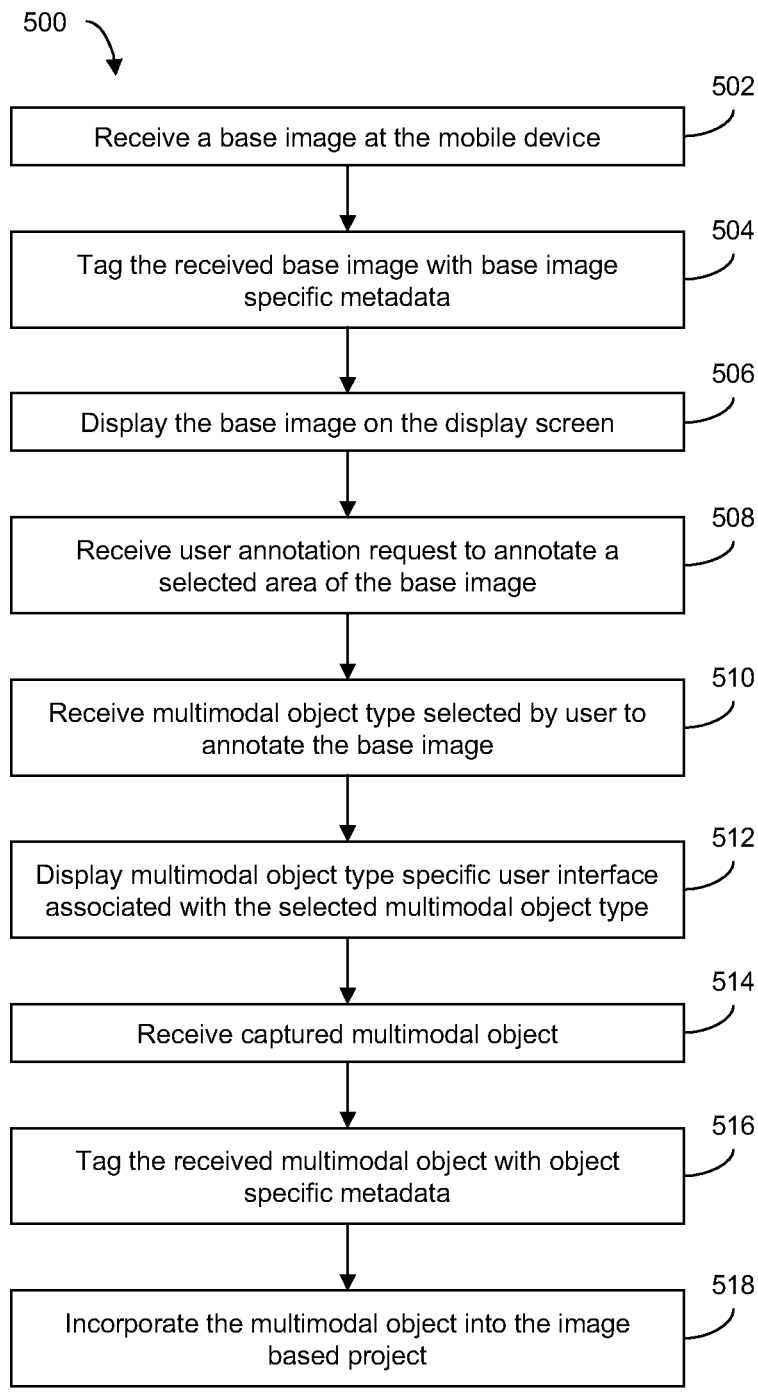
FIG. 5 is a flowchart representation of one embodiment of a method of managing an image based project at the mobile device.

Referring to FIG. 5, a flowchart representation of one embodiment of a method 500 of managing an image based project at the mobile device 102 is shown. The image capture module 230 receives a base image at the mobile device 102 at step 502. In one embodiment, the base image is captured at the mobile device 102 using the camera 216. In one embodiment, the base image is a scanned image received via a peripheral device that is communicative coupled to the mobile device 102. In one embodiment, the base image is received as an attachment to an email received at the mobile device 102. In one embodiment, the base image is an image that has been downloaded from a web site via the Internet. In one embodiment, the base image is an image captured using another device and then transmitted from that device to the mobile device 102. In one embodiment, the base image is a selected frame of a video recording. While a number of different mechanisms for capturing and/or receiving a base image at a mobile device 102 have been described, alternative mechanisms may be used to capture and/or receive a base image at the mobile device 102.

The image capture module 230 automatically tags the received base image with base image specific metadata at step 504. The base image specific metadata includes one or more of a time stamp, a global positioning system (GPS) location, and a mobile device identifier. While a number of different types of base image specific metadata have been described, the base image may be tagged with alternative types of base image specific metadata consisting of other forms of base image specific data parameters. The rendering module 236 displays the base image on the display screen 208 at step 506. Referring to FIG. 6, an illustration of one example of a base image 600 displayed on the display screen 208 of one embodiment of a mobile device 102 is shown.

Referring back to FIG. 5, the image annotation module 232 generally coordinates the annotation of the base image with one or more multimodal objects captured using the mobile device 102. In one embodiment, the user selects an area of the base image for annotation with a multimodal object thereby generating a user annotation request. The user annotation request is received by the image annotation module 232 at step 508. In one embodiment, display screen 208 is a touch screen display screen and the user selects an area of the base image for annotation by tapping on the selected area of the base image displayed on the display screen 208. In one embodiment, a cursor is used to select an area of the base image for annotation. Alternative mechanisms known to one of ordinary skill in the art for selecting an area of a base image displayed on a display screen 208 may be used.

The base image can be annotated using a number of different types of multimodal objects. Examples of different types of multimodal objects include, but are not limited, images, video, audio recordings, barcodes, structured text, free hand text, and free hand sketches. The user selects the multimodal object type that the user wishes to use to annotate the base image. The multimodal object type selected by the user to annotate the base image is received at the image annotation module at step 510.

In one embodiment, the image annotation module 232 displays a multimodal object type selection menu on the display screen 208 responsive to the receipt of the user annotation request. In one embodiment, the multimodal object type selection menu lists the different types of multimodal objects that can be captured at the mobile device 102. In one embodiment, the multimodal object type selection menu lists the mechanisms available for capturing multimodal objects at the mobile device 102. In one embodiment, the multimodal object type selection menu lists the multimodal object types that can be captured at the mobile device 102 and/or mechanisms available for capturing different types of multimodal objects at the mobile device 102. The user selects a multimodal object type from the multimodal object type selection menu and the multimodal object type selected by the user is received at the image annotation module 232 at step 510.

Referring to FIG. 7, an illustration of one example of a multimodal object type selection menu 700 displayed on the display screen 208 of one embodiment of a mobile device 102 is shown. The multimodal object type selection menu 700 lists keyboard, free text, voice, and video as user selectable options. Selecting keyboard enables the user to annotate the base image 600 using structured text. Selecting free text enables the user to annotate the base image 600 using free hand text. Selecting voice enables the user to annotate the base image 600 using an audio recording. One example of an audio recording is a recording of the user voice. Selecting video enables the user to annotate the base image 600 using video.

In one embodiment, the image annotation module 232 supports the use of a gesture-based user interface mechanism to select a multimodal object type. More specifically, the image annotation module 232 recognizes a plurality of different multimodal object type gestures, where each of the different multimodal object type gestures is associated with a specific type of multimodal object. The user enters a multimodal object type selection by entering the multimodal object type gesture associated with the selected multimodal object type via a touch screen display screen 208 and the multimodal object type selected by the user is received at the image annotation module 232 at step 510.

Referring to FIGS. 8(*a*) through (*d*), illustrations of examples of a plurality of different multimodal object type gestures that are recognized by one embodiment of an image annotation module 232 are shown. The multimodal object type gesture illustrated in FIG. 8(*a*) is recognized by the image annotation module 232 as a selection of structured text as the multimodal object type. The multimodal object type gesture illustrated in FIG. 8(*b*) is recognized by the image annotation module 232 as a selection of free hand text as the multimodal object type. The multimodal object type gesture illustrated in FIG. 8(*c*) is recognized by the image annotation module 232 as a selection of audio recording as the multimodal object type. The multimodal object type gesture illustrated in FIG. 8(*d*) is recognized by the image annotation module 232 as a selection of video as the multimodal object type. While examples of a number of different multimodal object type gestures have been described, alternative forms of gestures may be used to initiate the capture of different types of multimodal objects at the mobile device 102.

Referring back to FIG. 5, the image annotation module 232 displays the multimodal object type specific user interface associated with the multimodal object type selected by the user on the display screen 208 at step 512. The multimodal object type specific user interface guides the user through the steps to capture the desired multimodal object. The rendering module 236 displays a multimodal object type icon in the area of the base image that has been selected for annotation by the user. The specific multimodal object used to annotate the selected area of the base image is associated with the multimodal object type icon displayed in the selected area of the base image. Upon the selection of a specific multimodal object type icon displayed on the base image, the rendering module 236 responsively retrieves the multimodal object associated with the selected multimodal object type icon and renders the retrieved multimodal object at the mobile device 102. In one embodiment, the user is provided with the option of editing the rendered multimodal object.

Figures 9, 10:
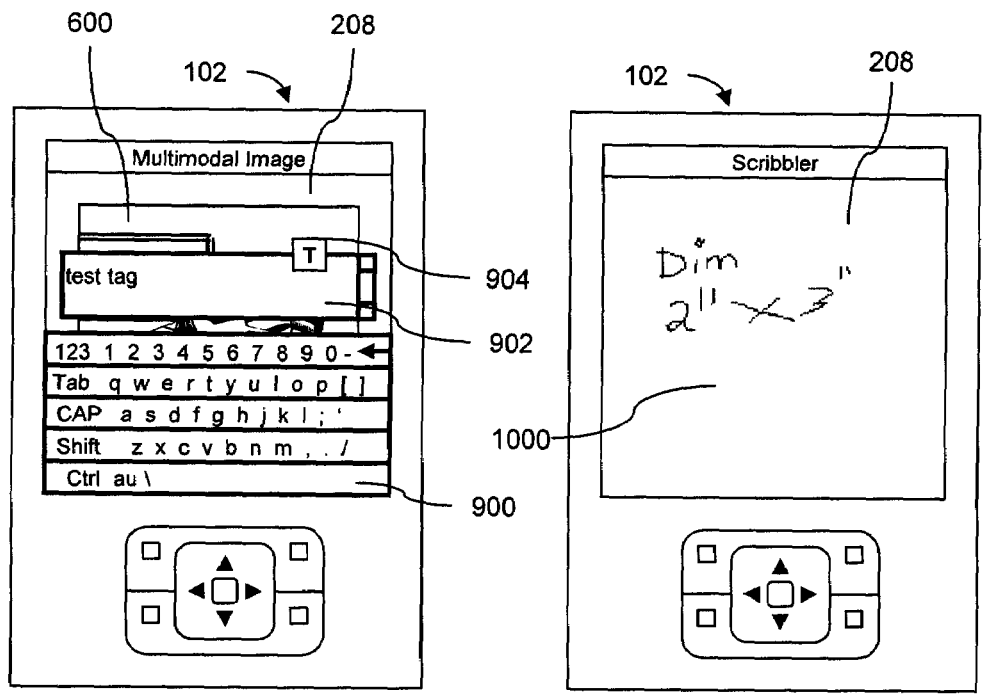
FIG. 9 is an illustration of one example of one embodiment of a multimodal object type specific user interface associated with the selection of structured text as the multimodal object type.
FIG. 10 is an illustration of one example of one embodiment of a multimodal object type specific user interface associated with the selection of free hand text as the multimodal object type.

Referring to FIG. 9, an illustration of one example of one embodiment of a multimodal object type specific user interface associated with the selection of structured text as the multimodal object type is shown. The multimodal object type specific user interface associated with the selection of structured text as the multimodal object type is displayed on the display screen 208 and includes a keyboard display 900 and a structured text display field 902. The display screen 208 is a touch screen display screen and the user utilizes the displayed keyboard 900 to enter the structured text annotation. The text entered by the user via the keyboard 900 is displayed in the text display field 902. A structured text icon 904 is displayed in the area of the base image 600 that has been selected for annotation by the user. Upon selection of the structured text icon 904 by the user, a structured text display field 902 with the structured text multimodal object associated with the selected structured text icon 904 is generated. The user is provided with the option of editing the structured text displayed in the structure text display field 902.

Referring to FIG. 10, an illustration of one example of one embodiment of a multimodal object type specific user interface associated with the selection of free hand text as the multimodal object type is shown. The multimodal object type specific user interface associated with the selection of free hand text as the multimodal object type is displayed on the display screen 208 and includes a free hand text display field 1000. The display screen 208 is a touch screen display screen and the user utilizes the free hand text display field 900 to enter the free hand text annotation. A free hand text icon (not shown) is displayed in the area of the base image 600 that has been selected for annotation by the user. Upon selection of the free hand text icon by the user, a free hand text display field 1000 with the free hand text multimodal object associated with the selected free hand text icon (not shown) is generated. The user is provided with the option of editing the free hand text displayed in the free hand text display field 1000.

Figures 11, 12:
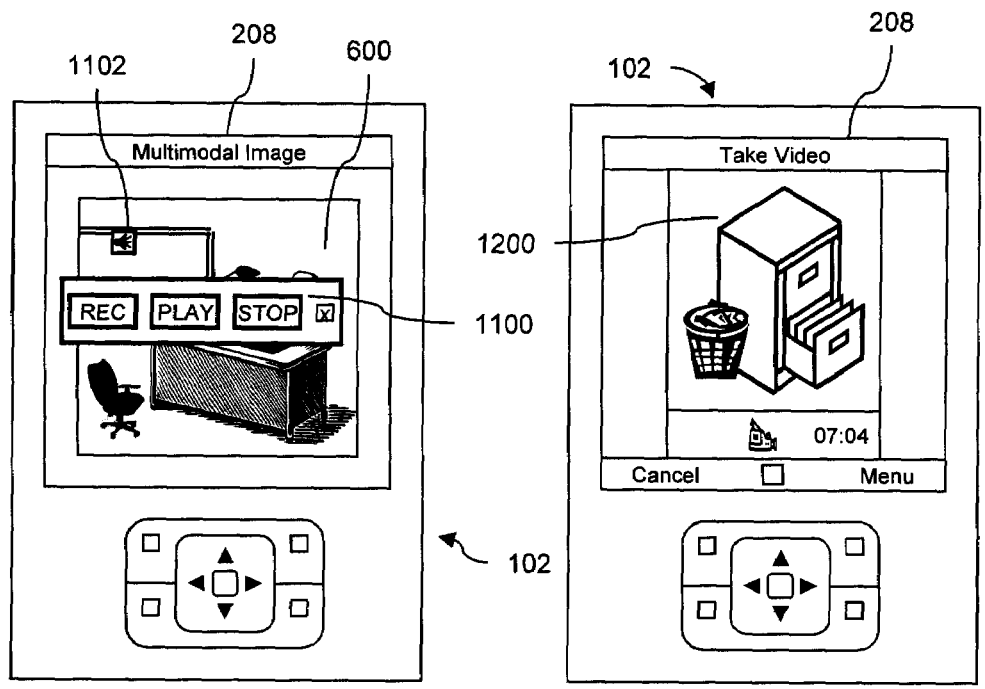
FIG. 11 is an illustration of one example of one embodiment of a multimodal object type specific user interface associated with the selection of an audio recording as the multimodal object type.
FIG. 12 is an illustration of one example of one embodiment of a multimodal object type specific user interface associated with the selection of video as the multimodal object type.

Referring to FIG. 11, an illustration of one example of one embodiment of a multimodal object type specific user interface associated with the selection of an audio recording as the multimodal object type is shown. The multimodal object type specific user interface associated with the selection of audio recording as the multimodal object type is displayed on the display screen 208 and includes an audio recording control panel 1100. The display screen 208 is a touch screen display screen and the user utilizes the displayed audio recording control panel 1100 to record the audio annotation. More specifically, the audio recording control panel 1100 includes a record button, a play button and a stop button. Selecting the play button initiates recording of the audio annotation, selecting the stop button stops the audio recording process, and selecting the play button enables the user to preview the recorded audio annotation. An audio recording icon 1102 is displayed in the area of the base image 600 that has been selected for annotation by the user. Upon selection of the audio recording icon 1102 by the user, the audio recording associated with the selected audio recording icon 1102 is generated. The user is provided with the option of editing the audio recording. For example, the user may rerecord or append the audio recording.

Referring to FIG. 12, an illustration of one example of one embodiment of a multimodal object type specific user interface associated with the selection of video as the multimodal object type is shown. The multimodal object type specific user interface associated with the selection of video as the multimodal object type is displayed on the display screen 208 and includes video display field 1200. The video annotation is displayed in the video display screen 1200 as the video annotation is being recorded. A video icon (not shown) is displayed in the area of the base image 600 that has been selected for annotation by the user. Upon selection of the video icon by the user, a video display field 1200 is generated and the video multimodal object associated with the selected video icon is played in the video display field 1200. The user is provided with the option of editing the video recording. For example, the user may rerecord or append the video recording.

Referring back to FIG. 5, the captured multimodal object is received at the image annotation module 232 at step 514. The image annotation module 232 tags the received multimodal object with object specific metadata at step 516. In one embodiment, the image annotation module 232 tags the received multimodal object with the user selected area of the base image. In one embodiment, the image annotation module 232 tags the received multimodal object with the coordinates of the selected area of the base image. In one embodiment, the image annotation module 232 tags the received multimodal object with one or more of a time stamp, a global positioning system (GPS) coordinate, and a mobile device identifier. While a number of different object specific metadata tags have been described, it should be noted that other forms of object specific metadata tags may also be used to tag the received multimodal object. In one embodiment, the user is provided with the option of performing intelligent searches of the multimodal objects using the object specific metadata tags.

The image annotation module 232 incorporates the captured multimodal object into the image based project at step 518. In one embodiment, an image based project is stored using a hierarchical data structure with the multimodal annotations being stored as objects of the associated base image. While the steps in the method 500 have been described in a particular order, the steps may also be performed in a different order. Furthermore, a subset of the described steps or additional steps may also be performed.

Figure 13:
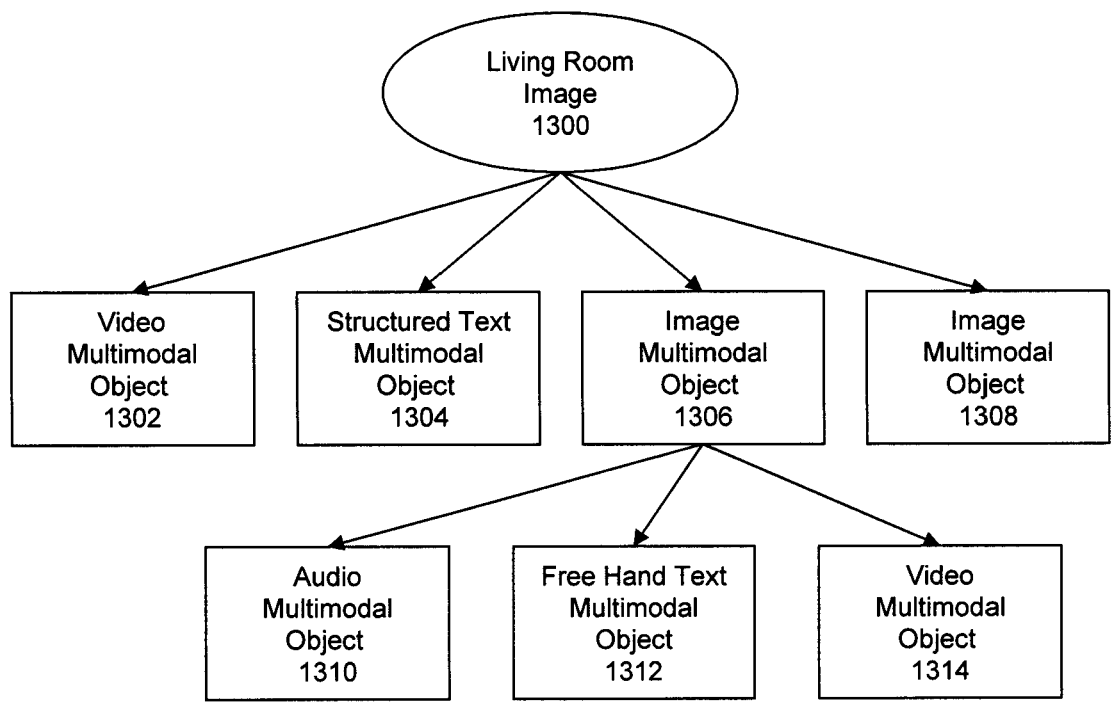
FIG. 13 is an illustration of one example of an embodiment of a hierarchical data structure representation of an image based project.

Referring to FIG. 13, an illustration of one example of an embodiment of a hierarchical data structure representation of an image based project is shown. The image based project is a living room decoration project. The living room decoration project includes a living room image 1300. The living room image 1300 has been designated a base image by user. The living room image 1300 has been annotated using a first plurality of multimodal objects. More specifically, the living room image 1300 has been annotated with a video multimodal object 1302, a structured text multimodal object 1304, and two image multimodal objects 1306, 1308. The image multimodal object 1306 has been designated as a base image by the user and annotated with a second plurality of multimodal objects. More specifically, the image 1306 has been annotated with an audio multimodal object 1310, a free hand text multimodal object 1312, and a video multimodal object 1314. Each object in the hierarchical data structure includes object specific metadata. The base image objects include base image specific metadata and the multimodal objects include multimodal object specific metadata. As illustrated in this example, image multimodal objects may also be annotated using additional multimodal objects. The living room decoration project may also include non-annotation objects. For example, a coupon associated with the purchase of an item for placement in the living room may be incorporated into the hierarchical data structure as a non-annotation object. In one embodiment, a non-annotation object is associated with a project. In one embodiment, a non-annotation object is associated with a base image. In one embodiment, a non-annotation object is associated with a multimodal object.

Figure 14:
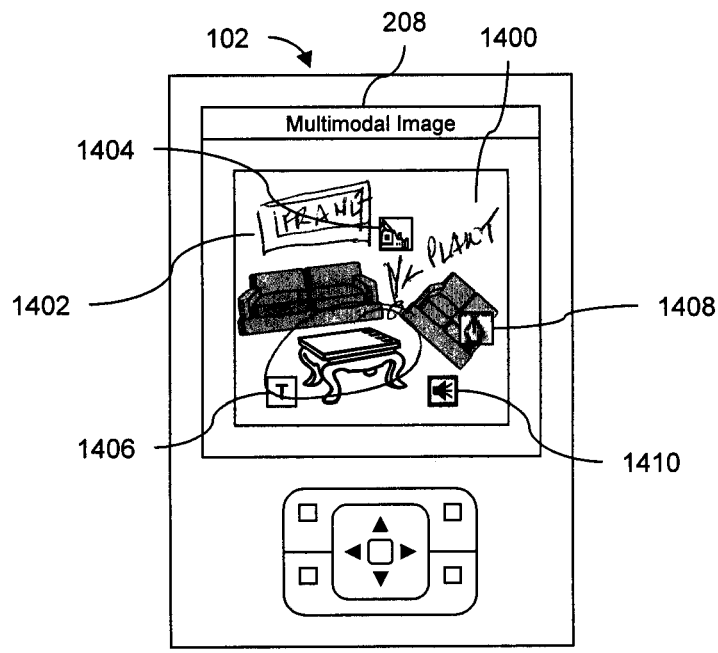
FIG. 14 is an illustration of an example of one embodiment of a base image 1400 annotated with a plurality of multimodal objects.

Referring to FIG. 14, an illustration of an example of one embodiment of a base image 1400 annotated with a plurality of multimodal objects is shown. The base image 1400 is an image of a living room. Each of the multimodal annotations 1404, 1406, 1408, 1410 is typically associated with a specific area of the base image 1400. Each of the multimodal annotations is typically represented by a multimodal object type icon 1404, 1406, 1408, 1410 identifying the type of the multimodal annotation. More specifically, the displayed base image 1400 has been annotated with a video multimodal object as indicated by the video icon 1404, a structured text multimodal object as indicated by the structured text icon 1406, a free hand text multimodal object as indicated by the free hand text icon 1408, and an audio multimodal object as indicated by the audio icon 1410. The location of each multimodal object type icon 1404, 1406, 1408, 1410 on the base image 1400 identifies the specific area of the base image 1400 annotated using the multimodal object associated with the specific multimodal object type icon 1404, 1406, 1408, 1410. In this example, the free hand sketching annotation 1402 is overlaid over the base image 1400 is not represented by a multimodal object type icon. Selection of any one of the multimodal object type icons 1404, 1406, 1408, 1410 results in the rendering of the multimodal object associated with the selected multimodal object type icon.

In one embodiment, the user is provided with the option of transmitting a copy of the image based project created on the mobile device 102 to a backend system 108 where the backend system 108 stores and hosts the received image based project. The user may wish to transfer a copy of the image based project from the mobile device 102 to the backend system 108 after the user has completed the collection of multimodal objects from a number of different locations where the mobile nature of the mobile device 102 facilitates the collection of such multimodal objects from multiple locations.

The mobile device 102 includes a data exchange module 234. The data exchange module 234 initiates the transfer of the image based project from the mobile device 102 to the backend system 108 responsive to a user request to transfer the image based project from the mobile device 102 to the backend system 108. In one embodiment, the user enters the user request to transfer the image based project via a user interface displayed on the display screen 208 of the mobile device 102. In one embodiment, the data exchange module 226 recognizes a tossing gesture entered via the display screen 208 as a user request to initiate the transfer of an image based project.

In one embodiment, the data exchange module 234 facilitates the transmission of the image based project from the mobile device 102 directly to the backend system 108. The data exchange module 234 interfaces with the backend system communication module 404 to establish a communication channel between the mobile device 102 and the backend system 108. In one embodiment, the communication channel is established via a network infrastructure. In one embodiment, the communication channel is established via the Internet. In one embodiment, the communication channel is established via a wireless communication channel. In one embodiment, the communication channel is established via a short range wireless communication. In one embodiment, the communication channel is established via a Bluetooth communication channel. In one embodiment, the communication channel is established via a wired communication channel. The data exchange module 234 coordinates the transmission of the image based project from the mobile device 102 to the backend system 108 via the established communication channel.

In one embodiment, the mobile device 102 transmits a copy of the image based project from the mobile device 102 to the backend system 108 via the local machine 104, 106. In one embodiment, the data exchange module 234 initiates the transfer of the image based project responsive to the receipt of a user request to transfer the image based project to the backend system 108. In one embodiment, the data exchange module 234 transmits a request to initiate the transfer of the image based project to the mediator module 322 at the local machine 104, 106. The mediator module 322 facilitates the exchange of data between the mobile device 102 and the backend system 108. The mediator module 322 responsively initiates the establishment of communicative coupling between the mobile device 102 and the backend system 108.

In one embodiment, the mediator module 322 is downloaded from the backend system 108 to a specific local machine 104, 106 during the first interaction between the local machine 104, 106 and the backend system 108. In one embodiment, the web browser 324 at the local machine 104, 106 is used to invoke the backend system 108 and the mediator module 322 is downloaded from the backend system 108 and installed at the local machine 104, 106. In one embodiment, the mediator module 322 is available on a storage device, such as for example a computer disc (CD). The mediator module 322 is installed onto the local machine 104, 106 from the storage device.

In one embodiment, the mediator module 322 is a Windows Form® object running as a process on a local machine 104, 106 and enables bi-directional interactions between a mobile device 102 and the backend system 108. In one embodiment, the mediator module 322 is activated at the local machine 104, 106 using Microsoft ClickOnce® technology. The web browser module 324 at the local machine 104, 106 activates a web page at the local machine 104, 106 and the Microsoft ClickOnce® application code is downloaded to the local machine 104, 106 and subsequently launched by the web browser module 324 thereby showing the form object. Via the Microsoft ClickOnce® protocol, the form-object can accept a set of input parameters from the backend system 108 where the code is located when the form is activated.

The mediator module 322 runs on the local machine 104, 106 and enables the local machine 104, 106 to create a first communication channel between the mobile device 102 and the local machine 104, 106 and a second communication channel between the local machine 104, 106 and the backend system 108. The data exchange module 234, at the mobile device 102, interfaces with the mediator module 322, at the local machine 104, 106, to establish the first communication channel. In one embodiment, the first communication channel is a wireless communication channel. In one embodiment, the first communication channel is created via a first networking infrastructure. In one embodiment, the first communication channel is a short range communication channel. In one embodiment, the first communication channel is a Bluetooth communication channel. In one embodiment, the first communication channel is a Wi-Fi communication channel. In one embodiment, the first communication channel is a wired communication channel.

The mediator module 322, at the local machine 104, 106, interfaces with the communication module 404, at the backend system 108, to establish the second communication channel. In one embodiment, the second communication channel is created via a second networking infrastructure. In one embodiment, the first networking infrastructure is separate from the second networking infrastructure. In one embodiment, the second networking infrastructure is the Internet.

Once the first and second communication channels linking the mobile device 102 to the backend system 108 have been established, the mediator module 322 interacts with the data exchange module 234 and the backend system communication module 404 to facilitate the exchange of data between the mobile device 102 and the backend system 108 via the first and second communication channels. The mediator module 322 is an application running at the local machine 104, 106 and operates under the control of the web browser module 324 during interactions with the backend system 108. The mediator module 322 receives the image based project from the mobile device 102, and transfers the received image based project to the backend system 108. The backend system 108 stores the received image based project in the backend database 408. The backend system 108 operates as a host and manages the received image base project.

In one embodiment, the backend system 108 grants access to the image based project to a user. In one embodiment, the backend system 108 grants an access token. The access token granted by the backend system 108 provides a user with access to the image based project via a local machine 104, 106. In one embodiment, the access token can be represented as a username and user password associated with the image based project. The backend system 108 grants access to the image based project via a local machine 104, 106 upon validation of a username and user password received from that local machine 104, 106 at the backend system 108. In one embodiment, the access token can be represented as a uniform resource locator (URL) address that is known only to the user. The URL address is transmitted to the mobile device 102 from the backend system 108, upon receipt of the image based project. In one embodiment, the URL address is sent to the mobile device 102 via email. In one embodiment, the URL address is sent to the mobile device 102 via the mediator module 322, with the mediator module 322 operating as a bridge between the mobile device 102 and the backend system 108. Use of the user specific URL at a local machine 104, 106 enable the user to access the image based project at the backend system 108 via the local machine 104, 106.

In some cases a multimodal annotation of a base image may consist of a large multimodal object. An example of a large multimodal object is a video recording. In one embodiment, the large multimodal object used to annotate a base image in the image based project is accessible at a specific URL address. An access token is used to provide access to the large multimodal object. Both the URL address and the access token are included as object specific metadata. In one embodiment, the access token and the URL are combined in such that the access token is appended to the end or the URL that represents the large multimodal object. When the user wishes to access the large multimodal object, the user selects the multimodal object type icon associated with the large multimodal object, the device displaying the image based project uses the URL and the access token to access the large multimodal object for review by a user.

Once the image based project has been transmitted from the mobile device 102 to the backend system 108, the user is able to use any local machine 104, 106 to gain access to a selected image based project. In one embodiment, the user is provided with the option of reviewing the image base project at a selected local machine 104, 106. In one embodiment, the web browser module 324 at the selected local machine 104, 106 establishes a communication channel between the selected local machine 104, 106 and the backend system 108 responsive to a user request to access an image based project received at the local machine 104, 106. The server 402 retrieves the requested image based project from the backend database 408 and generates a dynamic web page associated with the retrieved image based project for display at the local machine 104, 106. The web browser module 322 at the local machine 104, 106 displays the dynamic web page at the local machine 104, 106.

Referring back to FIG. 14, the illustration of the example of one embodiment of a base image 1400 annotated with a plurality of multimodal objects was described with respect to the mobile device 102. In one embodiment, the web page displays a base image and the associated multimodal objects in a similar manner at the local machine 104, 106. More specifically, the user selects a base image 1400 from the image based project for display via the dynamic web page displayed at the local machine 104, 106. The rendering module 414 at the backend system 108 responsively generates the base image 1400 including the multimodal object type icons 1404, 1406, 1408, 1410 for display on the dynamic web page displayed at the local machine 104, 106. The illustrated base image also includes free hand sketches 1402.

Each of the displayed multimodal object type icons 1404, 1406, 1408, 1410 is associated with a specific multimodal object associated with the base image 1400. The multimodal object type icon 1404, 1406, 1408, 1410 identifies the type of the multimodal annotation that has been used to annotate the base image 1400. The location of each multimodal object type icon 1404, 1406, 1408, 1410 on the base image 1400 identifies the specific area of the base image 1400 annotated using the multimodal object associated with the specific multimodal object type icon 1404, 1406, 1408, 1410. Upon the selection of any one of the displayed multimodal object type icons 1404, 1406, 1408, 1410 via the dynamic web page, the rendering module 414 responsively retrieves the multimodal object associated with the selected multimodal object type icon 1404, 1406, 1408, 1410 and renders the retrieved multimodal object at the local machine 104, 106.

In one embodiment, the user is provided with the option of modifying the image based project via the displayed web page. As mentioned above, upon the user selection of a multimodal object type icon, the rendering module 414 renders the multimodal object associated with the selected multimodal object type icon at the local machine 104, 106. In one embodiment, the user has the option of modifying or revising the selected multimodal object via the local machine 104, 106. The user specifies a desired modification to the rendered object via the dynamic web page at the local machine 104, 106. The image annotation module 412 at the backend system 108 responsively modifies the selected multimodal object in accordance with the user input received via dynamic web page displayed at the local machine 104, 106. In one embodiment, the image based project is stored as a hierarchical data structure with each of the multimodal annotations being stored as multimodal objects. The image annotation module 412 incorporates the received multimodal annotation modification by modifying the multimodal object within the hierarchical data structure associated with the selected multimodal annotation thereby generating an updated hierarchical data structure.

In one embodiment, the user is provided with the option of deleting a selected multimodal annotation of a base image of the image based project via the displayed web page. More specifically, the user selects a base image from the image based project for display via the dynamic web page displayed at the local machine 104, 106. The rendering module 414 at the backend system 108 responsively generates the base image including the multimodal object type icons of the multimodal objects associated with the selected base image for display on the dynamic web page displayed the local machine 104, 106. The user selects a multimodal object for deletion by selecting the associated multimodal object type icon from the displayed base image on the dynamic web page. The user issues a request to delete the selected multimodal object via the dynamic web page.

The image annotation module 412 at the backend system 108 responsively deletes the selected multimodal object in accordance with the user input received via dynamic web page displayed at the local machine 104, 106. In one embodiment, the image based project is stored as a hierarchical data structure with each of the multimodal annotations being stored as multimodal objects. The image annotation module 412 incorporates the received multimodal annotation deletion request by deleting the multimodal object in the hierarchical data structure associated with the selected multimodal annotation thereby generating an updated hierarchical data structure.

In one embodiment, the user is provided with the option of adding a multimodal annotation or multimodal object to a base image of the image based project via the displayed web page. More specifically, the user selects a base image from the image based project for display via the dynamic web page displayed at the local machine 104, 106. The rendering module 414 at the backend system 108 responsively generates the base image including the multimodal object type icons of the multimodal objects associated with the selected base image for display on the dynamic web page displayed the local machine 104, 106.

The user selects an area of the displayed base image for annotation via the dynamic web page at the local machine 104, 106. The backend system image annotation module 412 generates a multimodal object selection type selection menu for display on the dynamic web page at the local machine 104, 106. The user selects a multimodal object type from the displayed multimodal object type selection menu. The backend system annotation module 412 responsively generates the multimodal object type specific user interface associated with the selected multimodal object type for display on the dynamic web page at the local machine 104, 106. The multimodal object type specific user interface guides the user at the local machine 104, 106 through the steps to capture the desired multimodal object via a local machine peripheral device.

The multimodal object captured at the local machine 104, 106 is received by the backend system annotation module 412. The backend system annotation module 412 tags the received multimodal object with object specific metadata. In one embodiment, the image based project is stored as a hierarchical data structure with each of the multimodal annotations being stored as multimodal objects. The image annotation module 412 incorporates the received multimodal annotation into the hierarchical data structure as a multimodal object thereby generating an updated hierarchical data structure.

It should be noted that while a number of mechanisms for modifying an image based project that is stored and hosted by a backend system via a local machine have been described, alternative mechanisms for modifying an image based project at a backend system via a local machine may be used.

Figure 15:
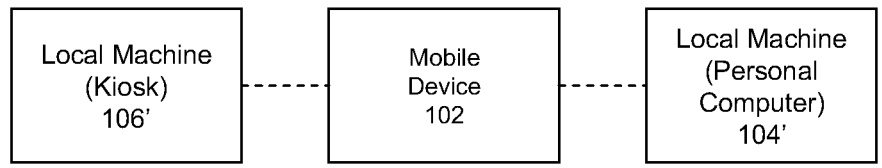
FIG. 15 is a block diagram representation of an example of a system that may be used to implement one embodiment of managing multimodal annotations of images in an image based project.

Referring to FIG. 15, a block diagram representation of an example of a system 1500 that may be used to implement one embodiment of managing multimodal annotations of images in an image based project is shown. The system 1500 generally includes a mobile device 102 and one or more local machines 104', 106'. The mobile device 102 is generally used to gather and organize data associated with an image based project. Examples of local machines 104', 106' include, but are not limited to, a personal computer 104' and an in-store kiosk 106'.

In one embodiment, the user is provided with the option of transmitting the image based project from the mobile device 102 to a local machine 104', 106'. In one embodiment, the user is provided with the option of storing the received image based project at the local machine 104', 106'. In one embodiment, the user is provided with the option of reviewing the received image based project at the local machine 104', 106'. In one embodiment, the user is provided with the option of modifying multimodal annotations of a base image of the received image based project at the local machine 104', 106'.

In one embodiment the user transmits the image based project from the mobile device 102 to a local machine 104', 106'. The user enters one or more multimodal annotation modifications to one or more base images in the image based project at the local machine 104', 106'. The local machine 104', 106' incorporates the received multimodal annotation modifications into the image based project and generates an updated version of the image based project. The user instructs the local machine 104', 106' to transmit the updated version of the image based project back to the mobile device 102. In one embodiment, the user repeats the described process with one or more additional local machines 104', 106'. For example, the user may wish to incorporate different multimodal annotation modifications to an image based project at a number of different in-store kiosks 106' where each in-store kiosk 106' is affiliated with a different retailer. In one embodiment, the user transmits the image based project to a personal computer 104'. The user, may, for example, wish to store a copy of the image based project on a personal computer 104' and/or further annotate the image based project at the personal computer 104'.

Figure 16:
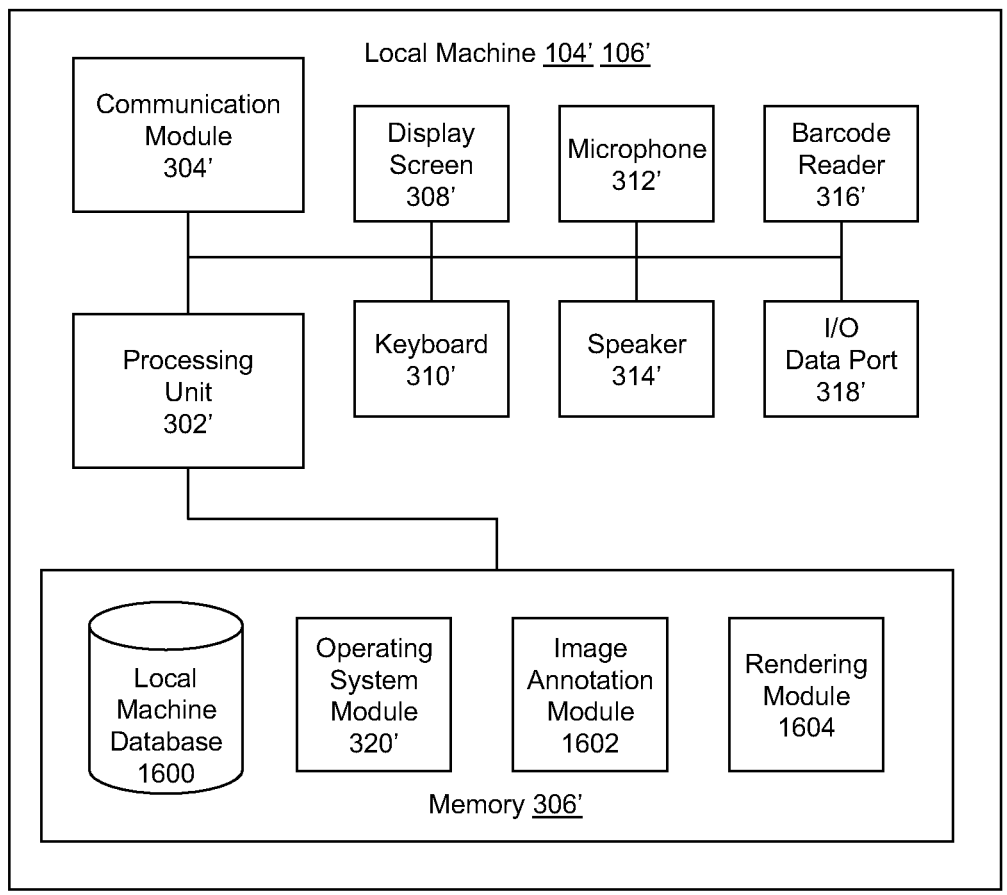
FIG. 16 is a block diagram representation of one embodiment of a local machine.

Referring to FIG. 16, a block diagram representation of one embodiment of a local machine 104', 106' is shown. The local machine 104', 106' generally includes a processing unit 302', a communication module 304', a memory 306' and a display screen 308'. The local machine 104', 106' also includes a number of peripheral devices including one or more of a keyboard 310', a microphone 312', a speaker system 314', a barcode reader 316', and input/output data port 318'.

The processing unit 302' generally includes a processor or controller. In one embodiment, the communication module 304' generally facilitates the exchange of data between the local machine 104', 106' and other devices. In one embodiment, the communication module 304' facilitates the exchange of data between the local machine 104', 106' and the mobile device 102'. In one embodiment, the communication module 304' supports communication via a networking infrastructure. In one embodiment, the communication module 304' supports communication via the Internet. In one embodiment, the communication module 304' supports wireless communication. In one embodiment, the communication module 304' supports short range wireless communication. In one embodiment, the communication module 304' supports Bluetooth communication. In one embodiment, the communication module 304' supports wired communication.

In one embodiment, an operating system module 320', a local machine database 1600, an image annotation module 1602, and a rendering module 1604 are stored in the memory 306'. Once an image based project has been transmitted from the mobile device 102 to the local machine 104', 106', the image annotation module 1602 generally coordinates the annotation of the base images using one or more multimodal objects captured at the local machine 104', 106' and the rendering module 1604 generally renders the image based project at the local machine 104', 106'. Alternative embodiments may include additional modules that facilitate the operation of the local machine 104', 106'.

In one embodiment, the memory 306' includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 302' generally retrieves and executes machine readable instructions or software programs that are stored in the memory 306'.

The data exchange module 234 at the mobile device 102 initiates the transfer of an image based project from the mobile device 102 to a local machine 104', 106' responsive to a user request to transfer the image based project. In one embodiment, the user enters the user request to transfer the image based project via a user interface displayed on the display screen 208 of the mobile device 102. In one embodiment, the data exchange module 226 recognizes a tossing gesture entered via the display screen 208 as a user request to initiate the transfer of an image based project.

In one embodiment, the local machine 104', 106' displays the received image based project on the display screen 308'. In one embodiment, the user selects a base image from the image based project for display. The rendering module 1604 responsively generates the selected base image including the multimodal object type icons associated with the multimodal annotations of the selected base image for display at the local machine 104', 106'. Upon the selection of any one of the displayed multimodal object type icons, the rendering module 1604 responsively renders the associated multimodal object at the local machine 104', 106'.

In one embodiment, the user is provided with the option of storing the image based project at the local machine 104', 106'. Upon the receipt of a user storage command to store the image based project at the local machine 104', 106', the processing unit 302' stores the received image based project in the local machine database 1600.

In one embodiment, the user is provided with the option of modifying the image based project at the local machine 104', 106'. As mentioned above, upon the user selection of a multimodal object type icon, the rendering module 1604 renders the multimodal object associated with the selected multimodal object type icon at the local machine 104', 106'. The user specifies a desired modification to the rendered object at the local machine 104', 106'.

The image annotation module 1602 at the local machine 104', 106' responsively modifies the selected multimodal object in accordance with the user input. In one embodiment, the image based project is stored as a hierarchical data structure with each of the multimodal annotations being stored as multimodal objects. The image annotation module 1602 incorporates the received multimodal annotation modification by modifying the multimodal object within the hierarchical data structure associated with the selected multimodal annotation thereby generating an updated hierarchical data structure.

In one embodiment, the user is provided with the option of deleting a selected multimodal annotation of a base image of the image based project at the local machine 104', 106'. More specifically, the user selects a base image from the image based project for display at the local machine 104', 106'. The rendering module 1604 responsively generates the base image including the multimodal object type icons of the multimodal objects associated with the selected base image for display at the local machine 104', 106'. The user selects a multimodal object for deletion by selecting the associated multimodal object type icon from the displayed base image.

The image annotation module 1602 responsively deletes the selected multimodal object in accordance with the user input received at the local machine 104', 106'. In one embodiment, the image based project is stored as a hierarchical data structure with each of the multimodal annotations being stored as multimodal objects. The image annotation module 1602 incorporates the received multimodal annotation deletion request by deleting the multimodal object in the hierarchical data structure associated with the selected multimodal annotation thereby generating an updated hierarchical data structure.

In one embodiment, the user is provided with the option of adding a multimodal annotation or multimodal object to a base image of the image based project at the local machine 104', 106'. More specifically, the user selects a base image from the image based project for display at the local machine 104', 106'. The rendering module 1604 responsively generates the base image including the multimodal object type icons of the multimodal objects associated with the selected base image for display at the local machine 104', 106'.

The user selects an area of the displayed base image for annotation. The image annotation module 1602 generates a multimodal object selection type selection menu for display at the local machine 104', 106'. The user selects a multimodal object type from the displayed multimodal object type selection menu. The image annotation module 1602 responsively generates the multimodal object type specific user interface associated with the selected multimodal object type for display at the local machine 104', 106'. The multimodal object type specific user interface guides the user at the local machine 104', 106' through the steps to capture the desired multimodal object via a local machine peripheral device.

The multimodal object captured at the local machine 104', 106' is received by the image annotation module 1602. The image annotation module 1602 tags the received multimodal object with object specific metadata. In one embodiment, the image based project is stored as a hierarchical data structure with each of the multimodal annotations being stored as multimodal objects. The image annotation module 1602 incorporates the received multimodal annotation into the hierarchical data structure as a multimodal object thereby generating an updated hierarchical data structure.

It should be noted that while a number of mechanisms for modifying an image based project at local machine have been described, alternative mechanisms for modifying an image based project at a local machine may be used.

Figure 17:
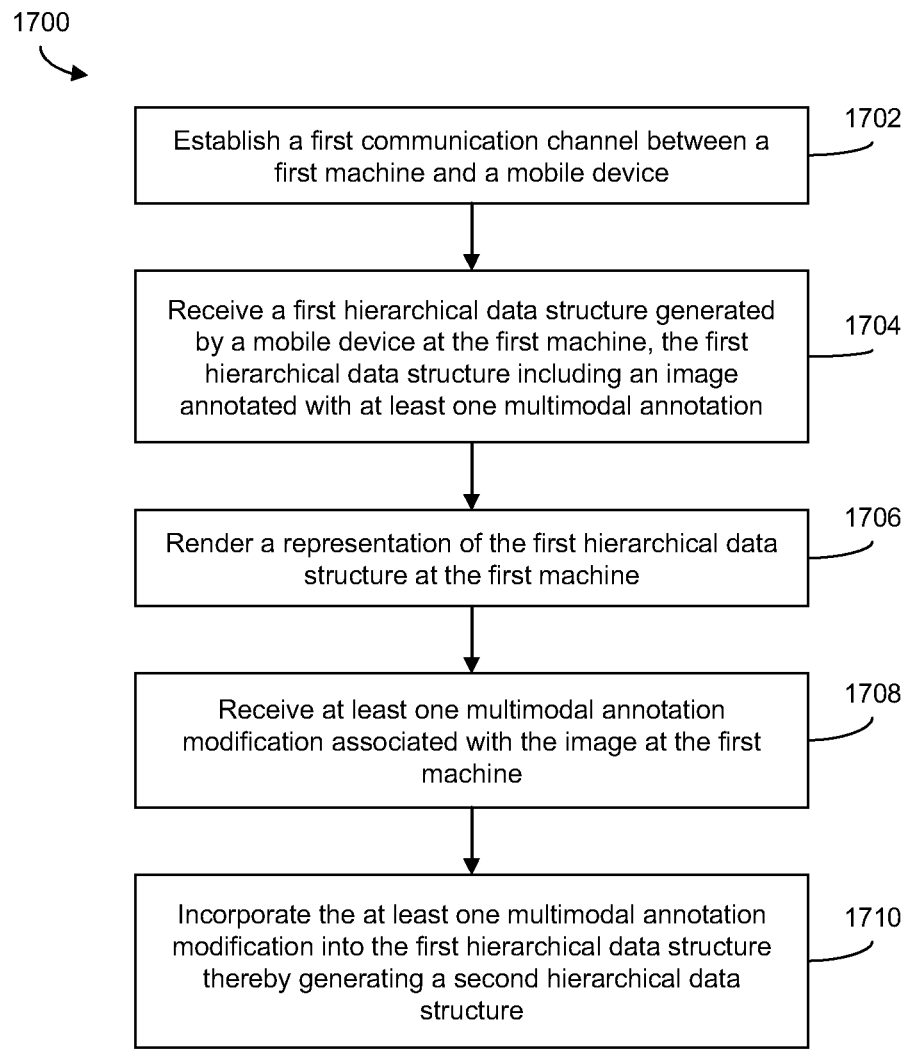
FIG. 17 is a flowchart representation of one embodiment of a method of managing multimodal annotations of an image.

Referring to FIG. 17, a flowchart representation of one embodiment of a method 1700 of managing multimodal annotations of an image is shown. A first communication channel is established between a first machine and a mobile device 102 at step 1702. In one embodiment, the first machine is a local machine 104, 106. In one embodiment, the first machine is a personal computer 104. In one embodiment, the first machine is an in-store kiosk 106. A first hierarchical data structure generated by the mobile device is received at the first machine at step 1704. The first hierarchical data structure includes an image annotated with at least one multimodal annotation. In one embodiment, the image is a base image. Examples of multimodal annotations include, but are not limited to, an image annotation, a voice annotation, a video annotation, a structured text annotation, a barcode annotation, a free hand text annotation, a free hand sketch annotation, and an audio annotation.

A representation of the first hierarchical data structure is rendered at the first machine at step 1706. In one embodiment, the base image and representations of the multimodal annotations associated with the base image are displayed at the local machine 104, 106. At least one multimodal annotation modification associated with the image is received at the first machine at step 1708. In one embodiment, the at least one multimodal annotation modification is the deletion of a multimodal object associated with a base image. In one embodiment, the at least one multimodal annotation modification is the addition of a multimodal object associated with a base image. In one embodiment, the at least one multimodal annotation modification is the modification of a multimodal object associated with a base image.

The at least one multimodal annotation modification is incorporated into the first hierarchical data structure thereby generating a second hierarchical data structure at step 1710. For example, incorporating a multimodal annotation modification into a hierarchical data structure representation of a base image annotated with at least one multimodal object results in the generation of a revised hierarchical data structure. While the steps in the method 1700 have been described in a particular order, the steps may be performed in a different order or additional steps may be performed in addition to the described steps.

In one embodiment, a computer readable medium stores a computer executable program for managing multimodal annotations of an image. The computer readable medium includes computer readable code for establishing a first communication channel between a first machine and a mobile device, computer readable code for receiving a first hierarchical data structure generated by the mobile device at the first machine, the first hierarchical data structure including an image annotated with at least one multimodal annotation, computer readable code for rendering a representation of the first hierarchical data structure at the first machine, computer readable code for receiving at least one multimodal annotation modification associated with the image at the first machine, and computer readable code for incorporating the at least one multimodal annotation modification into the first hierarchical data structure thereby generating a second hierarchical data structure.

Figure 18:
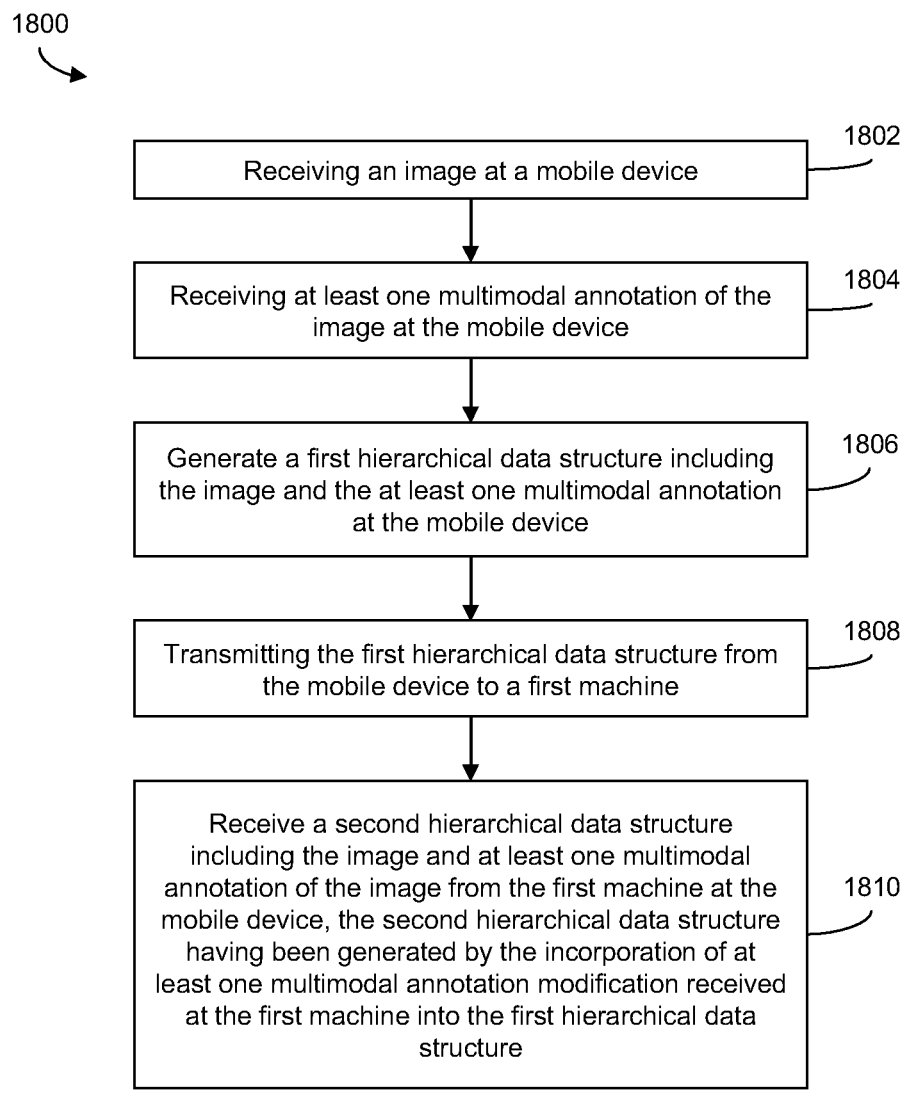
FIG. 18 is a flowchart representation of one embodiment of a method of managing multimodal annotations of an image.

Referring to FIG. 18, a flowchart representation of one embodiment of a method 1800 of managing multimodal annotations of an image is shown. An image is received at a mobile device 102 at step 1802 and at least one multimodal annotation of the image is received at the mobile device 102 at step 1804. A first hierarchical data structure including the image and the at least one multimodal annotation is generated at the mobile device 102 at step 1806. The first hierarchical data structure is transmitted from the mobile device 102 to a first machine at step 1808. Examples of a first machine include, but are not limited to a local machine 104, 106, a personal computer 104, and an in-store kiosk 106. A second hierarchical data structure including the image and at least one multimodal annotation of the image is received from the first machine at the mobile device 102 at step 1810 where the second hierarchical data was generated by the incorporation of at least one multimodal annotation modification received at the first machine into the first hierarchical data structure. While the steps in the method 1800 have been described in a particular order, the steps may be performed in a different order or additional steps may be performed in addition to the described steps.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing multimodal annotations of images, the method comprising:
   establishing a first communication channel between a first machine and a mobile device;
   receiving a first hierarchical data structure based on an image captured by the mobile device at the first machine, the image being annotated with at least one multimodal annotation, wherein the first hierarchical data structure comprises the image designated as a base image, the base image comprising the at least one multimodal annotation being represented by at least one multimodal annotation object, and a base image of the at least one multimodal object comprising any additional multimodal annotations being represented as additional multimodal objects;

rendering a representation of the first hierarchical data structure at the first machine;

receiving at least one multimodal annotation modification associated with the image at the first machine;

incorporating the at least one multimodal annotation modification into the first hierarchical data structure thereby generating a second hierarchical data structure;

establishing a second communication channel between the first machine and the mobile device; and transmitting the second hierarchical data structure from the first machine to the mobile device via the second communication channel.

2. The method of claim 1, further comprising providing a rendering module at the first machine, the rendering module being operable to render the representation of the first hierarchical data structure at the first machine.

3. The method of claim 1, further comprising providing an image annotation module at the first machine, the image annotation module being operable to incorporate the at least one multimodal annotation modification into the first hierarchical data structure thereby generating the second hierarchical data structure at the first machine.

4. The method of claim 1, wherein the first and second hierarchical data structures each include at least one multimodal annotation having a multimodal annotation type selected from a group consisting of an image annotation, a voice annotation, a video annotation, a structured text annotation, a barcode annotation, a free hand text annotation, a free hand sketch annotation, and an audio annotation.

5. The method of claim 1, wherein the first hierarchical data structure including an image annotated with at least one multimodal annotation comprises a first hierarchical data structure including an image annotated with a first multimodal annotation associated with a selected area of the image.

6. The method of claim 1, wherein the at least one multimodal annotation modification is selected from a group consisting of a multimodal annotation addition, a multimodal annotation deletion, and a multimodal annotation revision.

7. The method of claim 1, further comprising storing the second hierarchical data structure at the first machine.

8. The method of claim 1, further comprising:
establishing a third communication channel between the first machine and a backend system; and
transmitting the received first hierarchical data structure from the first machine to the backend system via the third communication channel for storage at the backend system.

9. The method of claim 8, further comprising providing a rendering module at the backend system, the rendering module being operable to render the representation of the first hierarchical data structure at the first machine.

10. The method of claim 9, further comprising:
receiving the at least one multimodal annotation modification from the first machine at the backend system;
providing an image annotation module at the backend system, the image annotation module being operable to incorporate the at least one multimodal annotation modification into the first hierarchical data structure thereby generating the second hierarchical data structure;
employing the rendering module to render a representation of the second hierarchical data structure at the first machine; and storing the second hierarchical data structure at the backend system.

11. The method of claim 10, further comprising:
establishing a fourth communication channel between a second machine and the backend system; and
employing the rendering module to render a representation of the second hierarchical data structure at the second machine.

12. A non-transitory computer readable medium for storing a computer executable program for managing multimodal annotations of images, the computer readable medium comprising:
computer readable code for establishing a first communication channel between a first machine and a mobile device;
computer readable code for receiving a first hierarchical data structure based on an image captured by the mobile device at the first machine, the image being annotated with at least one multimodal annotation, wherein the first hierarchical data structure comprises the image designated as a base image, the base image comprising the at least one multimodal annotation being represented by at least one multimodal annotation object, and a base image of the at least one multimodal object comprising any additional multimodal annotations being represented as additional multimodal objects;
computer readable code for rendering a representation of the first hierarchical data structure at the first machine;
computer readable code for receiving at least one multimodal annotation modification associated with the image at the first machine;
computer readable code for incorporating the at least one multimodal annotation modification into the first hierarchical data structure thereby generating a second hierarchical data structure;
computer readable code for establishing a second communication channel between the first machine and the mobile device; and
computer readable code for transmitting the second hierarchical data structure from the first machine to the mobile device via the second communication channel.

13. The non-transitory computer readable medium of claim 12, wherein the computer readable code for receiving a first hierarchical data structure comprises computer readable code for receiving a first hierarchical data structure including an image annotated with a first multimodal annotation having a multimodal annotation type selected from a group consisting of an image annotation, a voice annotation, a video annotation, a structured text annotation, a barcode annotation, a free hand text annotation, a free hand sketch annotation, and an audio annotation.

14. The non-transitory computer readable medium of claim 12, wherein the computer readable code for receiving a first hierarchical data structure generated by the mobile device at the first machine comprises computer readable code for receiving a first hierarchical data structure generated by the mobile device at the first machine, the first hierarchical data structure including an image annotated with a first multimodal annotation associated with a selected area of the image.

15. The non-transitory computer readable medium of claim 12, wherein the computer readable code for receiving at least one multimodal annotation modification associated with the image at the first machine comprises computer readable code for receiving a first multimodal annotation modification selected from a group consisting of a multimodal annotation addition, a multimodal annotation deletion, and a multimodal annotation revision.

16. The non-transitory computer readable medium of claim 12, further comprising computer readable code for storing the second hierarchical data structure at the first machine.

17. The non-transitory computer readable medium of claim 12, further comprising:
   computer readable code for establishing a third communication channel between the first machine and a backend system; and
   computer readable code for transmitting the received first hierarchical data structure from the first machine to the backend system via the third communication channel for storage at the backend system.

18. The non-transitory computer readable medium of claim 17, further comprising computer readable code for receiving a rendering of the representation of the first hierarchical data structure from the backend system at the first machine.

19. The non-transitory computer readable medium of claim 18, further comprising:
   computer readable code for transmitting the at least one multimodal annotation modification from the first machine to the backend system, the backend system being operable to incorporate the at least one multimodal annotation modification into the first hierarchical data structure thereby generating the second hierarchical data structure and to store the second hierarchical data structure; and
   computer readable code for receiving a rendering of the second hierarchical data structure from the backend system at the first machine.

20. The non-transitory computer readable medium of claim 19, further comprising:
   computer readable code for establishing a fourth communication channel between a second machine and the backend system; and
   computer readable code for receiving a rendering of a representation of the second hierarchical data structure at the second machine.

21. A method of managing multimodal annotations of images, the method comprising:
   receiving an image captured by a mobile device;
   receiving at least one multimodal annotation of the image captured by the mobile device;
   generating a first hierarchical data structure including the image and the at least one multimodal annotation at the mobile device;
   transmitting the first hierarchical data structure from the mobile device to a first machine;
   receiving a second hierarchical data structure including the image and at least one multimodal annotation of the image from the first machine at the mobile device, the second hierarchical data having been generated by the incorporation of at least one multimodal annotation modification received at the first machine into the first hierarchical data structure, wherein the first hierarchical data structure includes a non-annotation object associated with the image, wherein the non-annotation object includes a coupon.

22. The method of claim 1, wherein the rendering includes displaying the image.

* * * * *